United States Patent [19]

Richter

[11] Patent Number: 5,055,023

[45] Date of Patent: Oct. 8, 1991

[54] APPARATUS FOR MANUFACTURING LARGE-VOLUME HOLLOW BODIES OF PLASTICS MATERIAL HAVING MULTIPLE-LAYER WALLS

[76] Inventor: Günter Richter, Johannistal 12, D-5230, Altenkirchen, Fed. Rep. of Germany

[21] Appl. No.: 510,060

[22] Filed: Apr. 17, 1990

Related U.S. Application Data

[62] Division of Ser. No. 109,728, Oct. 16, 1987, Pat. No. 4,937,035.

[30] Foreign Application Priority Data

Oct. 17, 1986 [DE] Fed. Rep. of Germany ....... 3635334

[51] Int. Cl.$^5$ ............................................. B29C 47/06
[52] U.S. Cl. .............................. 425/133.100; 425/381; 425/462; 425/467
[58] Field of Search ...................... 425/131.1, 381, 532, 425/466, 376.1, 380, 462, 467; 264/173, 541, 167

[56] References Cited

U.S. PATENT DOCUMENTS

| | | | |
|---|---|---|---|
| 3,516,118 | 6/1970 | Gallay | 425/532 |
| 4,152,104 | 5/1979 | Przytulla et al. | 425/133.1 |
| 4,297,092 | 10/1981 | Goron | 425/133.1 |
| 4,422,838 | 12/1983 | Iwawaki et al. | 425/381 |
| 4,472,129 | 9/1984 | Siard | 425/381 |
| 4,522,775 | 6/1985 | Briggs et al. | 425/133.1 |
| 4,578,025 | 3/1986 | Ando et al. | 425/381 |
| 4,609,340 | 9/1986 | Irwin et al. | 425/532 |
| 4,758,144 | 7/1988 | Becker | 425/133.1 |

Primary Examiner—Jay H. Woo
Assistant Examiner—William J. Matney, Jr.
Attorney, Agent, or Firm—Toren, McGeady & Associates

[57] ABSTRACT

An apparatus for manufacturing large-volume hollow bodies of plastics material with multiple-layer walls. The apparatus defines an accumulation chamber and has a nozzle outlet. A plurality of material layers are joined into a multiple-layer plastic material melt within a tubular plunger which is movable in axial direction of the apparatus. The multiple-layer plastics material melt is conducted in a flow duct which widens in the shape of a funnel toward the accumulation chamber. The tubular plunger is forced by the melt to move in axial direction away from the nozzle outlet. The material melt is ejected as a multiple-layer extruded material by moving the tubular plunger in axial direction toward the nozzle outlet.

4 Claims, 4 Drawing Sheets

APPARATUS FOR MANUFACTURING LARGE-VOLUME HOLLOW BODIES OF PLASTICS MATERIAL HAVING MULTIPLE-LAYER WALLS

This is a division of application Ser. No. 07/109,728 filed Oct. 16, 1987 now U.S. Pat. No. 4,937,035.

BACKGROUND OF THE INVENTION

1. Field of the Invention

The present invention relates to a blow molding apparatus and a method for manufacturing large-volume hollow bodies of plastics material having multiple-layer walls.

2. Description of the Prior Art

Co-extrusion methods for manufacturing hollow bodies of the above-described type of plastics material having a maximum volumetric size of about 20 liters are known. The volumetric size of the hollow bodies to be manufactured is limited in this method by the length of the continuously extruded preform.

For the manufacture of articles having large volumes, preforms are required which have higher weights and, thus, greater lengths. However, in carrying out the continuous extrusion method, these preforms are extended during the extrusion in such a way that a defined wall thickness distribution in the article is no longer obtainable. In addition, due to the longer mold cooling times of hollow bodies having thick walls and large volumes, the preform cools off in the ambient air to such an extent that a problem-free welding of the mash seams can no longer be guaranteed. Thus, technological problems limit the use of the known method to hollow bodies having relatively small volumes.

Hollow bodies having large volumes and including barrier layers for improving the impermeability of the bodies are to be used as motor vehicle tanks, barrels, containers and storage vessels.

Accordingly, attempts have been made in the past to develop suitable manufacturing methods for producing hollow bodies having large volumes.

A particular difficulty is the uniform formation of several different layers of material in a material accumulation chamber as it is required for the discontinuous blowing process. It is not possible to simply transfer the previously known blow head constructions for single-layer hollow bodies. This is because, in the production of hollow bodies having multiple-layer walls, each of the individual material layers must be extruded in the blow head, must be joined together to form a multiple-layer melt composite and must be ejected in such a way that the uniform thickness of each individual layer is ensured.

In accordance with a known method, the individual melts are extruded outside of the blow head into separate accumulation chambers and the layers are joined in a subsequently arranged nozzle gap. The following difficulties are encountered in the use of this method.

First, it is extremely difficult to control the method in order to adjust the output speeds of the individual accumulation chambers in such a way that the necessary thicknesses of the layers can always be obtained in a repeatable manner uniformly over the entire length of the article to be manufactured and in accordance with the desired wall thickness profiles of the articles.

Second, joint lines occur in each material layer because each material melt must flow during the ejection process around the mandrel with increased shear velocity. Particularly in the case of plastics material of high molecular weight, this leads to weak points in the finished articles.

In addition, since the thicknesses of the individual layers are influenced by the output speed from the individual accumulation chambers as well as by the control for the wall thickness, the necessary adjustment of both of these parameters relative to each other poses a problem with respect to control and regulation. Accordingly, this known method is not satisfactory.

In accordance with another known method, the melts are conducted into accumulation chambers of individual tubular plungers. Each of these tubular plungers is driven by a hydraulic or mechanical drive. Also in this case, the adjustment of the individual output speeds relative to each other poses a problem with respect to control. Although joint lines are avoided when this method is used, a very expensive and complicated apparatus is required for manufacturing, for example, an article having a five-layer wall structure composed of inner carrier layer, coupling agent, barrier layer, coupling agent and outer carrier layer.

It is, therefore, the primary object of the present invention to provide a method and an apparatus of the above-described type which can be used for manufacturing articles having walls with any chosen number of layers, wherein the method is easy to control and the apparatus is not complicated and expensive.

SUMMARY OF THE INVENTION

In accordance with the present invention, the melts for the individual layers are introduced into and joined within a tubular plunger and the resulting multiple-layer melt is conducted through a funnel-shaped widening portion of the flow duct until the melt reaches the width of an annular accumulation chamber.

When the individual melts are extruded into this annular accumulation chamber, the tubular plunger moves away from a nozzle outlet. During the output process, the hydaulically or mechanically driven tubular plunger forces the multiple-layer melt toward the nozzle outlet through a flow duct which narrows in the shape of a funnel toward the nozzle outlet.

It has been found that the layers are not destroyed and the thicknesses of the layers are not changed during the ejection process. The individual layers remain exactly proportional to the changes in the cross-sectional sizes during the flow process. This is true for the accumulation process as well as for the ejection process.

A completely different behavior is exhibited by multiple-layer melts which are ejected by means of a flat piston through an appropriate cross-sectional outlet area. When a flat piston is used, contrary to the piston construction according to the present invention, a non-uniform outlet of the individual melt thicknesses occurs. The melt layer in the middle initially is ejected with a layer thickness which increasingly becomes smaller. Finally, at the end of the ejection process, only the individual layers flow out.

The tubular plunger used in accordance with the present invention makes it additionally possible to produce uniformly any desired layer thickness by a simple control of the extruder screw speed.

Compared to the apparatus used in known methods, the apparatus used in carrying out the method of the present invention is inexpensive and uncomplicated.

Only a drive for the movement of the tubular plunger for effecting the ejection movement is required.

In accordance with the present invention, several types of operations are possible.

In accordance with a simple embodiment of the present invention, extruders are connected to the tubular plunger in an articulated manner, so that the extruders follow the movements of the tubular plunger. Accordingly, it is necessary to mount the extruders in the region of the extruder drives in a swivelable manner and linearly movable in direction of the respective extruder axis.

In accordance with another embodiment of the present invention, the extruders are rigidly connected to the tubular plunger to form a unit. The movements to be carried out by this unit during the conveying and ejecting procedures may then be supported by a synchronized drive.

It is also possible to have these movements carried out by the accumulation chamber wall and the mandrel, while the extruder and the tubular plunger are rigidly connected to the machine frame.

The different types of operation according to the present invention described above make it possible to produce large-volume, multiple-layer hollow bodies in a simple manner and with uniform quality.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
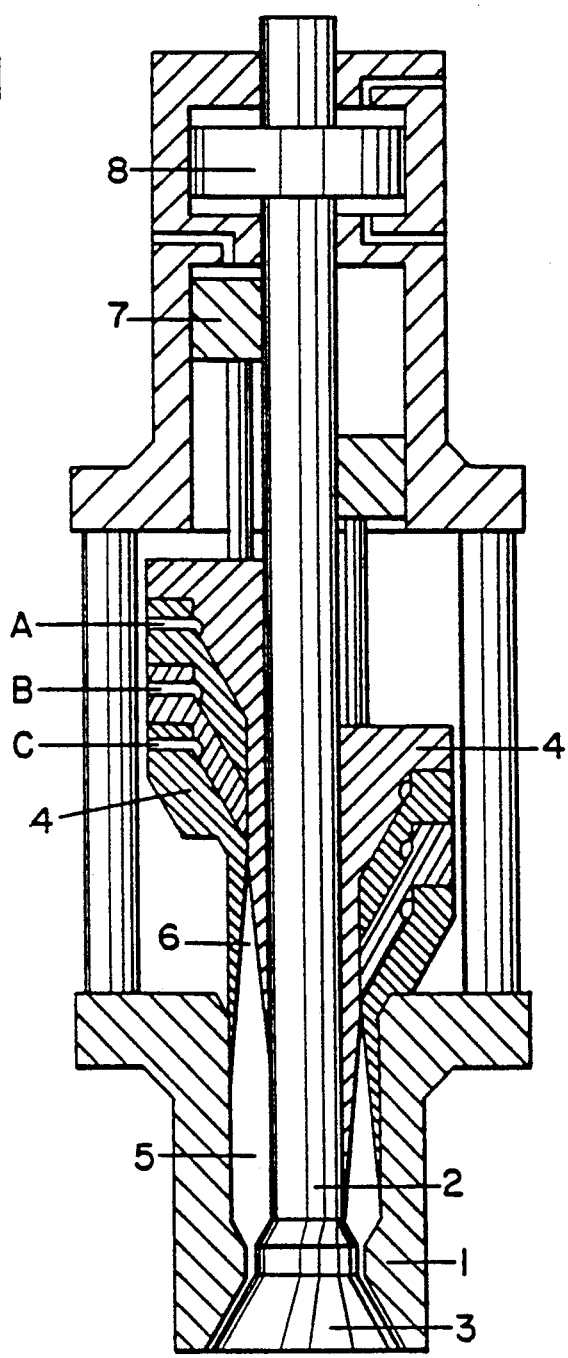
FIG. 1 is a schematic sectional view of an extruder head with tubular plunger in accordance with the present invention.

As illustrated in FIG. 1 of the drawing, an extruder head includes an accumulation chamber wall 1, a mandrel 2 with nozzle member 3 and a tubular plunger 4. As illustrated in the drawing, tubular plunger 4 is equipped for handling three materials A, B and C. Accumulation chamber wall 1 defines an annular accumulation chamber 5.

The tubular plunger defines toward the outlet end thereof a flow duct 6 which widens in the shape of a funnel. A hydraulic piston 7 for effecting the ejection procedure and the nozzle adjusting cylinder 8 are arranged behind tubular plunger 4.

In the illustration of FIG. 1, the tubular plunger 4 is shown on the lefthand side of the extruder head in the upper position or the position remote from the nozzle. On the righthand side of the extruder head, the tubular plunger 4 is shown in the lower position or the position close to the nozzle.

Figure 2:
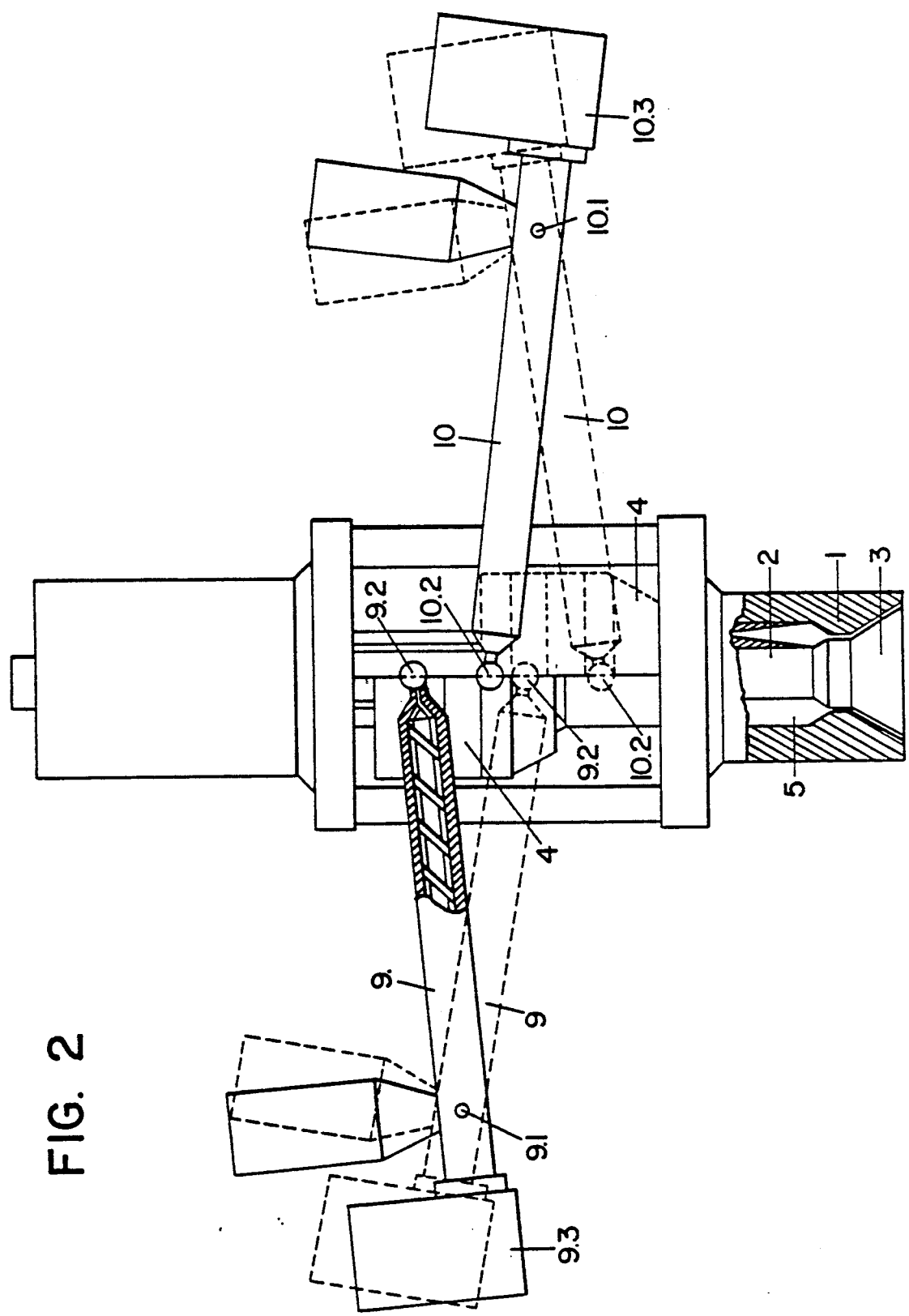
FIG. 2 is a schematic view, partially in section, of an embodiment of the present invention, showing a possible connection of extruders to the tubular plunger.

FIG. 2 of the drawing shows schematically a possible connection of extruders 9 and 10 to tubular plunger 4 in an articulated manner in connecting points 9.2 and 10.2. Extruders 9 and 10 are swivelable about points 9.1 and 10.1 in the region of extruder drives 9.3 and 10.3.

For clarity's sake, the extruders 9 and 10 are illustrated in FIG. 2 in the upper position thereof in solid lines and in the lower position thereof in broken lines. The tubular plunger 4 is shown on the lefthand side of the extruder head in solid lines in the upper position thereof and on the righthand side of the extruder head in broken lines in the lower position thereof.

Figure 3:
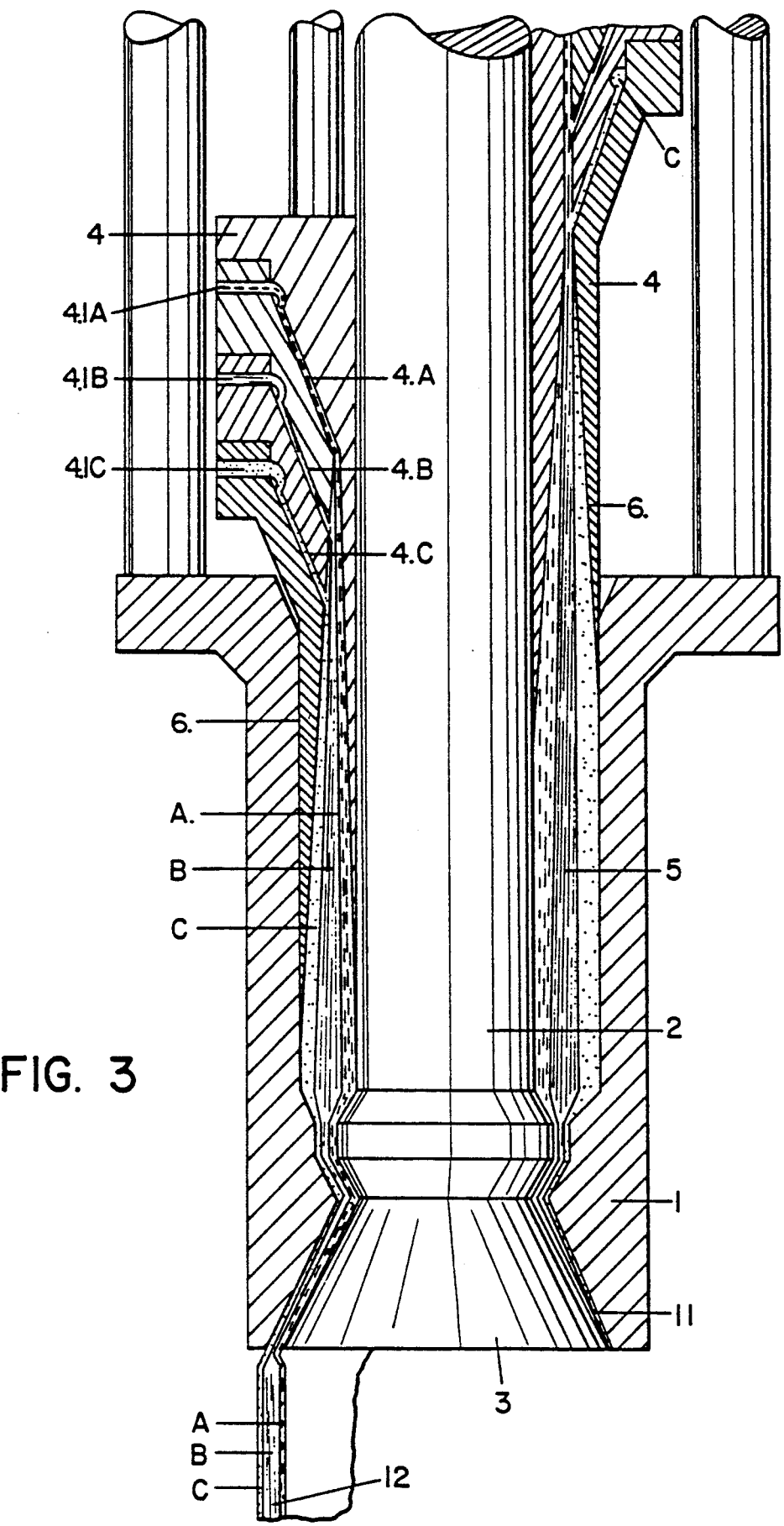
FIG. 3 is a partial sectional view, on a larger scale, of the extruder head, showing the flow behavior of the material to be extruded.

A shown in FIG. 3, tubular plunger 4 defines anular flow ducts 4.A, 4.B and 4.C for forming material layers A, B and C. Flow ducts 4.A, 4.B and 4.C are connected through bores 4.1.A, 4.1.B, 4.1.C to the respective extruder connections 9.2 and 10.2.

The flow behavior of the material layers A, B and C is schematically illustrated on a larger scale in FIG. 3. The material layer distributions of the materials A, B and C are illustrated in tubular plunger 4, in the funnel-shaped widening portion of flow duct 6, in the annular accumulation chamber 5, in the nozzle gap 11 and, finally, as the extruded material 12.

In the case of FIG. 3, tubular plunger 4 is shown in the lower position thereof on the lefthand side of the extruder head and in the upper position thereof on the righthand side of the extruder head.

As FIG. 3 of the drawing shows, the material 12 is extruded from the extruder head according to the present invention with the material layers A, B and C of uniform thickness.

Figure 4A:
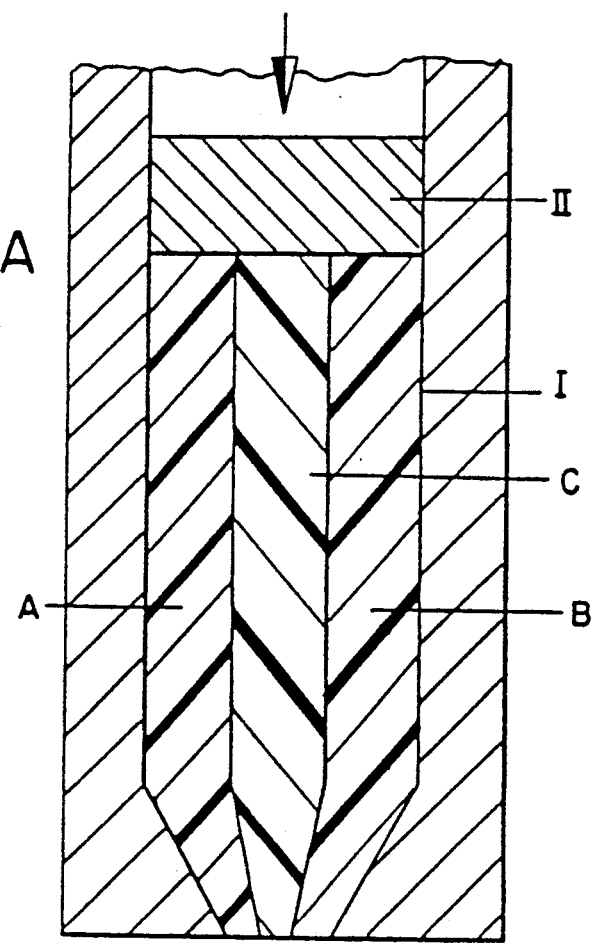
FIGS. 4a and 4b show schematically the flow behavior of a multiple-layer material extruded by a prior art extruder head with flat plunger.
Figure 4B:
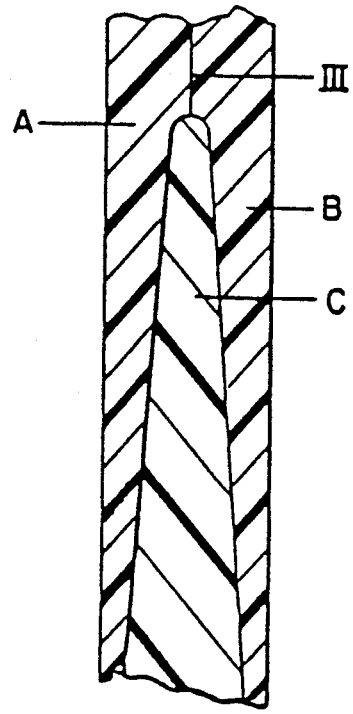

FIG. 4a, on the other hand, shows the flow behavior of the materials A, B and C within an accumulation chamber I as it is extruded by a conventional flat plunger II. The material III extruded by this flat plunger II is shown in FIG. 4b. As FIG. 4b shows, the three materials A, B and C form non-uniform layers within the extruded material III.

While specific embodiments of the invention have been shown and described in detail to illustrate the application of the inventive principles, it will be understood that the invention may be embodied otherwise without departing from such principles.

I claim:

1. In an apparatus for discontinuously manufacturing multiple-layer, tubular preforms of thermoplastic material for making large-volume hollow bodes having multiple-layer walls, the apparatus including a divided blow molding apparatus defining an annular accumulation chamber, the annular accumulation chamber having an axis, a mandrel coaxially disposed in the annular accumulation chamber, a tubular plunger projecting into the annular accumulation chamber, the annular accumulation chamber being in communication with at least two extruders which provide at least two individual material melts through an annular flow duct and a flow duct bore in communication with the annular flow duct, the tubular plunger defining a funnel-shaped flow duct, the funnel-shaped flow duct widening toward the annular accumulation chamber to the same width as the annular accumulation chamber, the annular accumulation chamber having a length which is increased when an extrusion pressure is applied, and a drive for decreasing the length of the annular accumulation chamber and ejecting the material metal as a multiple-layer extruded material, the improvement comprising the tubular plunger being an axially displaceable coextrusion means for joining the at least two individual material melts, the annular flow ducts and the flow duct bores being arranged in the tubular plunger, wherein the annular flow ducts in the tubular plunger open into the funnel-shaped flow duct.

2. The apparatus according to claim 1, wherein the tubular plunger is connected to the extruders in an articulated manner, the extruders being swivelable about linearly movable axes of rotation located near the drives of the extruders.

3. The apparatus according to claim 1, wherein the tubular plunger is rigidly connected to the extruders, so that the extruders move together with the tubular plunger in the axial direction.

4. In an apparatus for discontinuously manufacturing multiple-layer, tubular preforms of thermoplastic material for making large-volume hollow bodies having multiple-layer walls, the apparatus including a divided blow-molding apparatus defining an annular accumulation chamber, the annular accumulation chamber having an axis, a mandrel coaxially disposed in the annular accumulation chamber, a tubular plunger projecting into the annular accumulation chamber, the annular accumulation chamber being in communication with at least two extruders which provide at least two individual material melts through an annular flow duct and a flow duct bore in communication with the annular flow duct, the tubular plunger defining a funnel-shaped flow duct, the funnel-shaped flow duct widening toward the annular accumulation chamber to the same width as the annular accumulation chamber, the annular accumulation chamber having a length which is increased when an extrusion pressure is applied, and a drive for decreasing the length of the annular accumulation chamber and ejecting the material melt as a multiple-layer extruded material, the improvement comprising the tubular plunger being a coextrusion means for joining the at lest two individual material melts, the annular flow ducts and the flow duct bores being arranged in the tubular plunger, wherein the annular flow duct in the tubular plunger open into the funnel-shaped flow duct, and wherein the tubular plunger and the extruders are fixedly mounted in the apparatus, and the mandrel being displaceable in the axial direction.

* * * * *